US008028662B2

(12) United States Patent
Raymond

(10) Patent No.: US 8,028,662 B2
(45) Date of Patent: Oct. 4, 2011

(54) METHOD OF TRAINING A DOG TO CHEW ACCEPTABLE OBJECTS THROUGH SCENT MARKING AND CHEMICAL COMPOSITION THEREOF

(76) Inventor: Laurel D. Raymond, Glenwood Springs, CO (US)

( * ) Notice: Subject to any disclaimer, the term of this patent is extended or adjusted under 35 U.S.C. 154(b) by 204 days.

(21) Appl. No.: 12/570,313

(22) Filed: Sep. 30, 2009

(65) Prior Publication Data

US 2010/0242859 A1   Sep. 30, 2010

Related U.S. Application Data

(60) Provisional application No. 61/109,925, filed on Oct. 31, 2008.

(51) Int. Cl.
*A01K 29/00*   (2006.01)
(52) U.S. Cl. ................. 119/712; 119/711; 119/905
(58) Field of Classification Search ............... 119/709, 119/710, 711, 712, 905, 174, 702, 707, 708
See application file for complete search history.

(56) References Cited

U.S. PATENT DOCUMENTS

| | | | | |
|---|---|---|---|---|
| 7,409,924 | B2 * | 8/2008 | Kates ................... | 119/720 |
| 2001/0047771 | A1 * | 12/2001 | Bulanda et al. .......... | 119/712 |
| 2004/0211369 | A1 * | 10/2004 | Wechsler ................ | 119/707 |
| 2006/0196445 | A1 * | 9/2006 | Kates ................... | 119/719 |
| 2008/0216765 | A1 * | 9/2008 | Kates ................... | 119/712 |
| 2009/0031966 | A1 * | 2/2009 | Kates ................... | 119/719 |
| 2009/0114167 | A1 * | 5/2009 | Axelrod et al. ........... | 119/710 |

* cited by examiner

*Primary Examiner* — Trinh Nguyen
(74) *Attorney, Agent, or Firm* — Graham & Dunn PC; Kathleen T. Petrich

(57) ABSTRACT

A positive-reinforced method of training a dog to chew or mouth only appropriate household items and chew toys. The method includes scent-training the dog (or puppy) to recognize a particular distinctive scent not normally found in nature as applied to an acceptable chewing object. The dog is introduced to the distinctive scent and encouraged to chew the marked acceptable chewing object. Each time the dog recognizes the scent, the dog is encouraged to chew the scented chewing object or some other acceptable chewing object marked with the distinctive scent and rewarded. The dog is tested with at least one unmarked object. The dog is trained once the dog can discriminate between the scent-marked object or objects and the unmarked object or objects. From there, the scent may be applied to other household items that are acceptable chewing/mouthing items (e.g., other chew toys). By absence of the scent, the dog recognizes that it cannot chew on unacceptable items (e.g., furniture, shoes). The scent may be applied to acceptable chewing/mouthing items in liquid form or as a gel. The scent is aromatic to dogs but not to people. The invention also includes the chemical composition of the scent used in the method training. The preferred chemical composition comprises of one part animal secretion, one part disparate animal secretion, and three parts aqueous solution.

13 Claims, 5 Drawing Sheets

METHOD OF TRAINING A DOG TO CHEW ACCEPTABLE OBJECTS THROUGH SCENT MARKING AND CHEMICAL COMPOSITION THEREOF

RELATED APPLICATION

The present application claims priority to U.S. Provisional Patent Application Ser. No. 61/109,925, filed on Oct. 31, 2008, and entitled "Dog Training Aid."

TECHNICAL FIELD

This invention relates to a positive reinforcement method of scent training a dog regarding acceptable chewing and a chemical composition of a scent.

BACKGROUND OF THE INVENTION

This invention arises within the field of positive reinforcement based dog training philosophy and methodology, and provides a solution to a long-standing problem.

One of the first learning tasks a puppy or newly adopted dog must accomplish upon arrival in a household is to recognize the items it is permitted to chew on and play with and to discriminate between those items and others that must be left alone. There are several reasons why this is a particularly difficult task.

Puppies and dogs naturally explore their environment and investigate objects within it by using their mouths. Teething—the shedding of deciduous teeth and the eruption of adult teeth—is a protracted process taking the entire first year of a canine's life. During these months, a dog is often driven to relieve sore gums by chewing on objects which have a soothing texture. For dogs of all ages, chewing is an inherently satisfying activity and one of the chief stress-relieving behaviors utilized by canines. Human environments are rich with objects arousing curiosity and/or providing satisfying outlets for the chewing drive. For these reasons, dog owners provide their dogs with toys for chewing, shaking, tugging and other behaviors which dogs find satisfying.

Dog toys come in myriad sizes, shapes, materials, scents, tastes and textures. To a dog, there is no obvious way to distinguish dog toys from other objects such as children's toys, clothing, books and household items, furniture, etc., any of which may be equally or more attractive to the dog than the designated toys.

The current and prior art provides many methods by which the owner or trainer may correct (punish) the dog for selecting inappropriate items for play or chewing, or deter the dog, through use of applied repellants, from mouthing prohibited objects, but provides no method by which a dog can identify for itself items that are approved for play.

The substances and devices of current art used in this training include repellant substances that can be applied to non-approved items causing a dog to avoid mouthing them; aversive-tasting materials which punish a dog's incorrect selection of a play item, electric shocking devices or devices emitting a punishing sound when a dog investigates non-approved objects.

All the afore-mentioned training aids belong to the category of punishers or aversives. These are generally avoided by trainers who prefer to use positive reinforcement methods and aids. While punishment can have a legitimate role in training, it has significant drawbacks—especially when employed by persons with a low level of skill. To be effective, punishment in training must be immediate, sufficient but not excessive, inevitable, and clearly identified with its precipitating action. Even when these criteria are met, there is the certainty that fear will be engendered. Fear is undesirable because it interferes with learning and because it adversely affects the animal's bond with the owner or trainer. Such bond, if allowed to form and nurture, strengthens motivation for learning.

Some dog toys have been designed to deliver food rewards to the dog that chews on and plays with them. While these provide some positive reinforcement for that particular object selection by the dog, once the food has been consumed, there is no particular reason for the dog to choose to play with that object.

Chewing is known by dog behavior experts to be a self-reinforcing pleasurable activity, as well as a stress or anxiety-relieving activity and an exploratory activity. And since chewing inappropriate objects can destroy valuable property and also cause harm to the dog, training dogs to recognize and select approved play objects and avoid other items, without the necessity for the owner's constant supervision and intervention, is a high priority objective for most dog owners.

Heretofore, there has been no safe and effective way to accomplish this. Such a lack of method of training has resulted in much confusion and anxiety on the part of dogs and much frustration, anger, and damage to property on the part of owners.

The field of positive dog training has long needed a way to facilitate dogs' learning to recognize approved play objects so that correct choices can be positively reinforced, leading to the recognition of the category of permitted play objects without sole reliance on punishment and aversives.

SUMMARY OF THE INVENTION

The present invention is directed to a positive-reinforcement, scent marking training method of training a dog to chew or mouth only acceptable objects marked with a distinctive scent not normally found in nature. The invention also includes a chemical composition of the distinctive scent. This method is superior to known training methods as there is no need for punishment or aversives and it trains the dog how to choose only acceptable chewing/mouthing objects or items through a way that is consistent with general nature of dogs.

The method of positive scent training includes introducing a dog (or puppy) in need of acceptable chewing training to at least one acceptable chewing object to which the distinctive scent has been applied. The dog is then allowed to positively identify the scent with the acceptable chewable object as the dog is allowed to chew or mouth the scented acceptable chewable object. The dog is also introduced to at least one unmarked object. If the dog ignores the unmarked object or objects or mouths/chews the scent-marked object or objects, the dog is rewarded. If the dog mouths an unmarked object, the owner/breeder interrupts the dog. Interruption may take the form of NRM (no reward marker), removing the unmarked object, replacing the unmarked object with the scent-marked object, and generally rewarding the dog. The dog is re-tested until it can discriminate between the scented marked object or objects (acceptable chewing) and the unmarked object or objects (unacceptable mouthing/chewing).

Once the dog can discriminate between the scent-marked objects (acceptable for mouthing/chewing) and unmarked objects (unacceptable for mouthing/chewing), the scent may be applied only to other acceptable mouthing/chewing objects (toys). The dog develops an olfactory search image for the scent and associates that scent with acceptable chewing. By the absence of the scent, the dog recognizes that the object is not acceptable for chewing and/or mouthing, such as furniture or shoes.

The method can be adapted for breeders in order to get a "jump start" on training a litter of puppies from about week three of the puppies lives until the puppies are able to go to a new home with their new respective new owner(s), which is usually between the eighth and tenth weeks after the puppies were born. The distinctive scent is applied to all items that the puppies are allowed to investigate and play with. The puppies associate the scent with pleasurable activities (chewing, mouthing, playing). When the new puppy owner takes possession of the new puppy, the breeder gives the scent to the new owner. The new owner applies the scent to acceptable chewing objects in the new home, which the puppy will associate with pleasurable activities (chewing, mouthing, playing). The new owner can continue the training of the puppy as discussed above. But the puppy will enter the new home comfortable with a scent that it knows and associates with playing. In this way, the puppy has started training prior to transferring to a new home and can significantly cut down on the "the terrible puppy chewing" period that routinely occurs with placement of a new puppy.

The distinctive scent may be made from animal secretions (urine/other bodily secretions) diluted in an aqueous solution. According to one aspect of the invention, one part animal secretion, e.g., urine of deer, elk, muskrat, raccoon, rabbit, squirrel; and is combined with one part disparate animal secretion, e.g., urea of pheasant, grouse, quail, partridge, turkey, duck or goose, and three parts aqueous solution, e.g., distilled water. In one form, the scent is one part raccoon urine, one part quail urine or urea, and three parts distilled water. The scent is highly attractive to dogs, but is generally undetectable by humans.

Because this invention enables a dog to easily recognize a scent when it is applied to objects, and because the identified scent is never encountered on any other objects, and because this scent is attractive to dogs as being from an animal source, it facilitates the desired learning to identify all objects marked with the scent as permissible play objects. The inhibition of selecting and mouthing forbidden objects is much easier after this learning has taken place, and the dog that has learned this will thereafter easily recognize and correctly identify scent marked objects as toys it can confidently chew on.

These and other advantages will become more apparent upon review of the Drawing, the Detailed Description of the Invention, and the Claims.

DETAILED DESCRIPTION OF THE INVENTION

Figure 1:
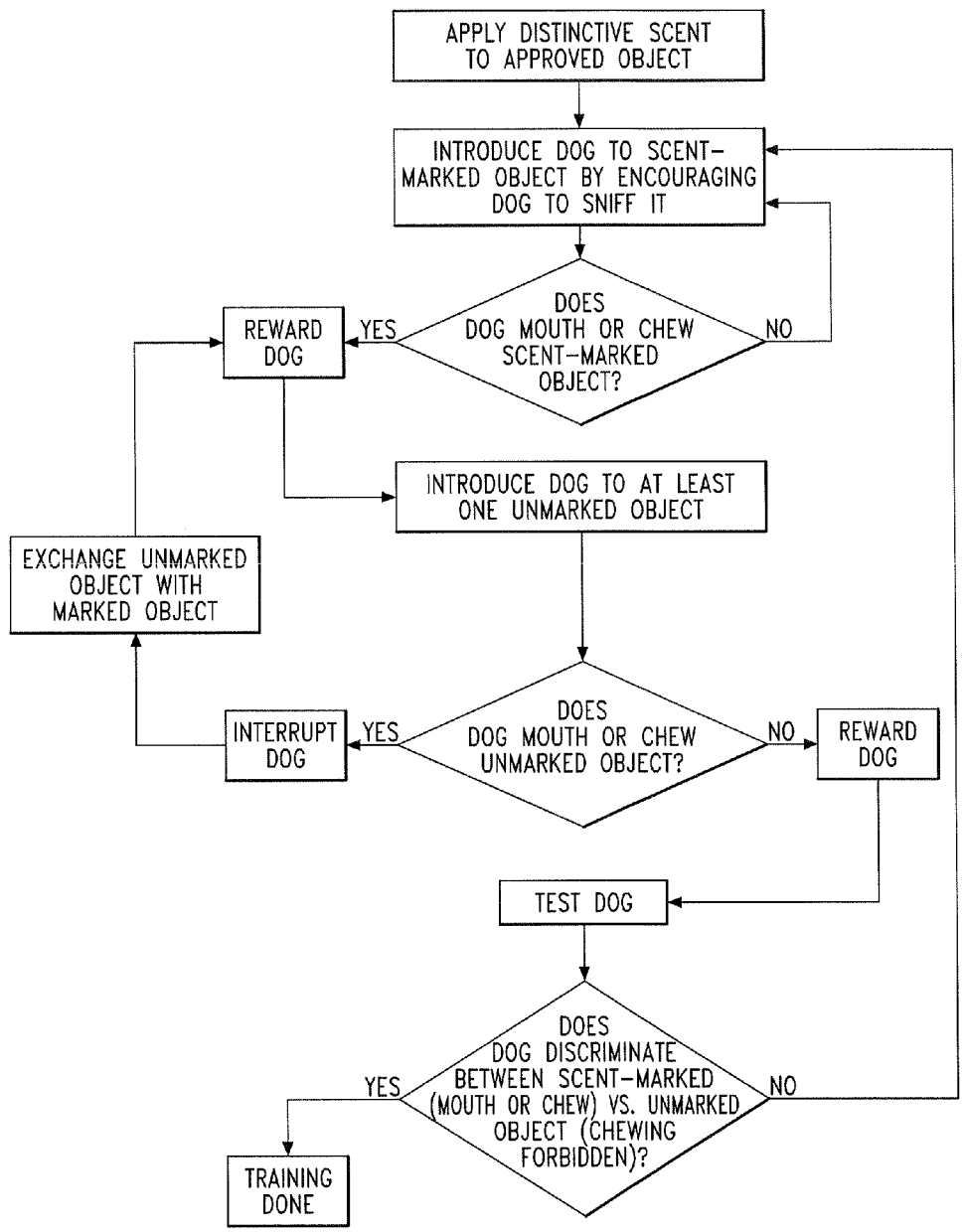
FIG. 1 is a flow chart of a method of positive-reinforced, scent discrimination dog training as to what is an acceptable chewing/mouthing object.

Referring to FIG. 1, the present invention is a method of positively-reinforced training of a dog using scent to convey permission regarding what objects are acceptable for chewing and/or mouthing. The dog is introduced to an acceptable chewing object, such as a dog toy, that is marked with the distinctive scent. The dog is then encouraged to chew, mouth and play with the marked acceptable chewing object or other scent-marked acceptable chewing object. When the dog chews or mouths the scent marked object, the dog is rewarded. At least one unmarked object is introduced to the dog. If the dog ignores the unmarked item or investigates but does not mouth the unmarked item, the dog is rewarded. But if the dog mouths the unmarked item, the owner interrupts with a corrective action.

The dog may be rewarded by petting, 'scratches' behind the ears or other place the owner/breeder knows that the dog likes to be scratched, hugs, positive attention, treats, or in other ways that the owner/breeder knows that the dog enjoys. If the owner or breeder uses a clicker as a reward marker, the reward step may be used in connection with the clicker and the normally accompanied treat.

Figure 2:
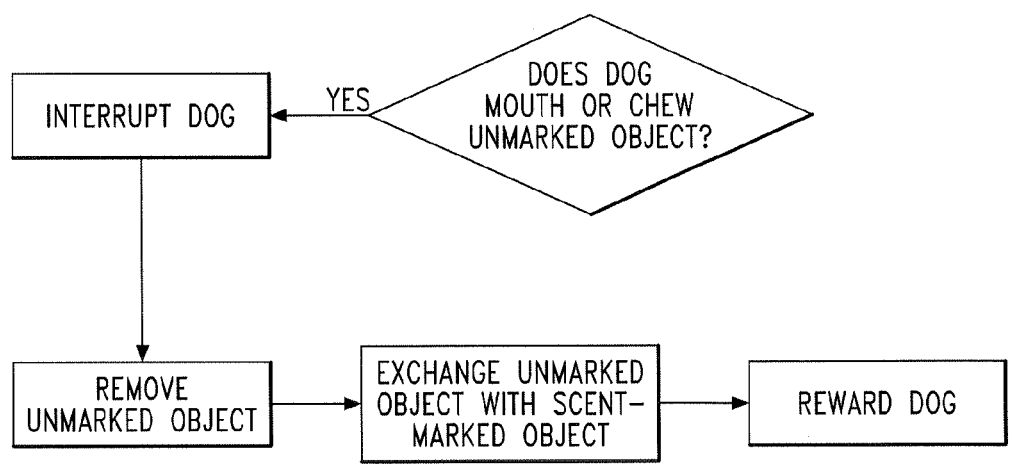
FIG. 2 is a truncated flow chart of a method of interruption.

Referring also to FIG. 2, interruptive (corrective) action is preferably taken in the form of positive action and preferably not punitive. According to one aspect of the invention, the corrective action includes NRM, or removing the unmarked item, replacing the unmarked item with a scent-marked object, and rewarding the dog. NRM, or "no rewards" marker, may include the well known technique of making a specific sound already known by the dog to indicate that it's action was unacceptable and that the dog "is not going to get a reward" (e.g., a treat).

The dog is tested with the unmarked and scent-marked object or objects until the dog can discriminate between the scent-marked object or objects (acceptable for mouthing/chewing) and the unmarked object or objects (unacceptable for mouthing/chewing). This step is repeated until the dog recognizes the scent and associates it with acceptable chewing and/or mouthing.

In this way the dog associates the scent with acceptable chewing. As chewing is a pleasurable past time that is in the dog's nature, the scent will be associated with pleasurable activity. Thus, the dog will smell the distinctive smell on "approved" objects and know that it will not be hindered from chewing and/or mouthing the scent-marked objects.

Figure 3:
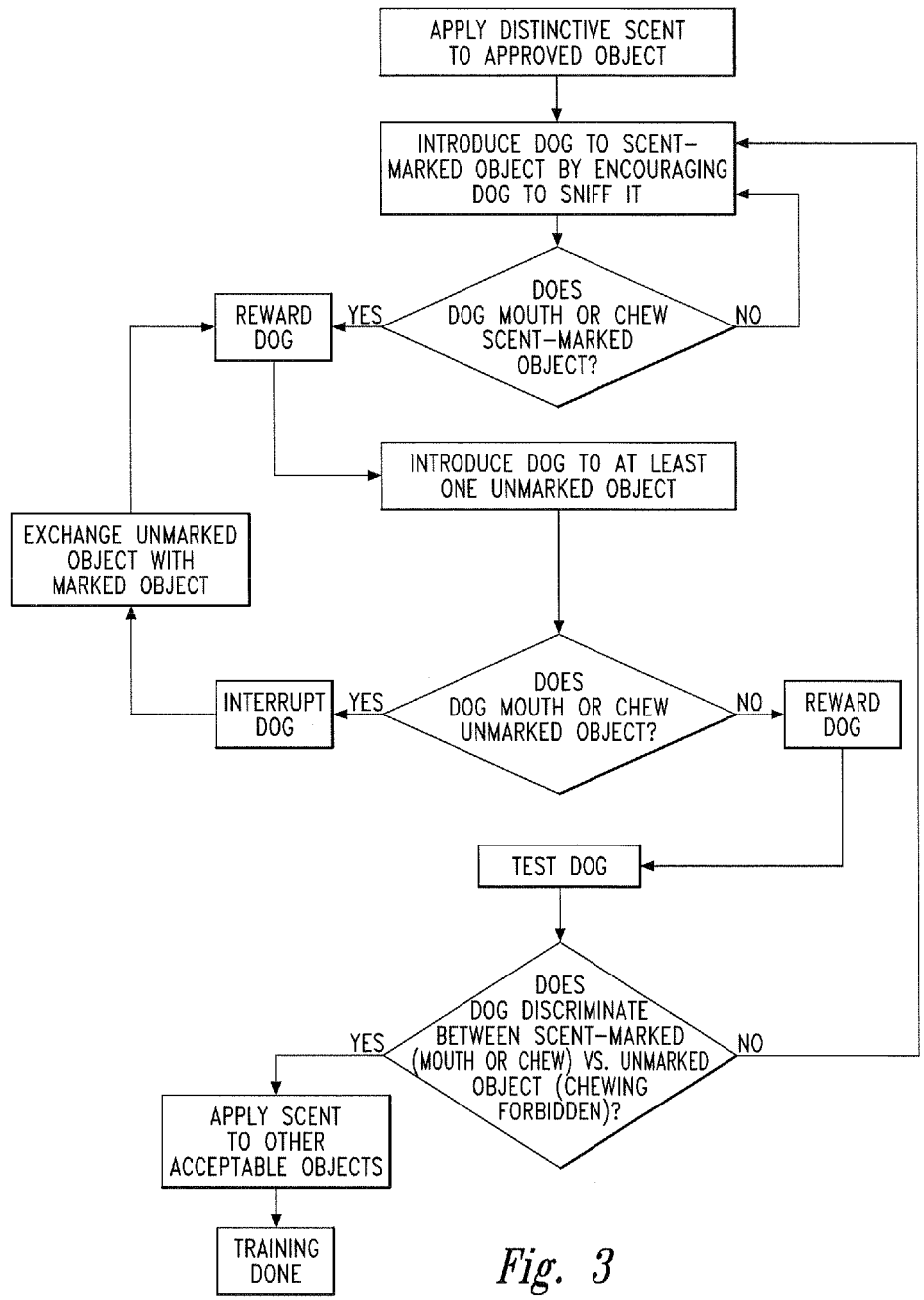
FIG. 3 is a flow chart of a first alternate method of invention.

Referring to FIG. 3, according to another aspect of the invention, the scent may be applied to all other acceptable objects (household, other) once the dog associates the scent with acceptable chewing and/or mouthing. Alternatively, the distinctive scent can be applied to all of the dog's toys at once. Thus, for the duration of the dog's life, new objects given to the dog would be initially marked with the distinctive scent.

Figure 4:
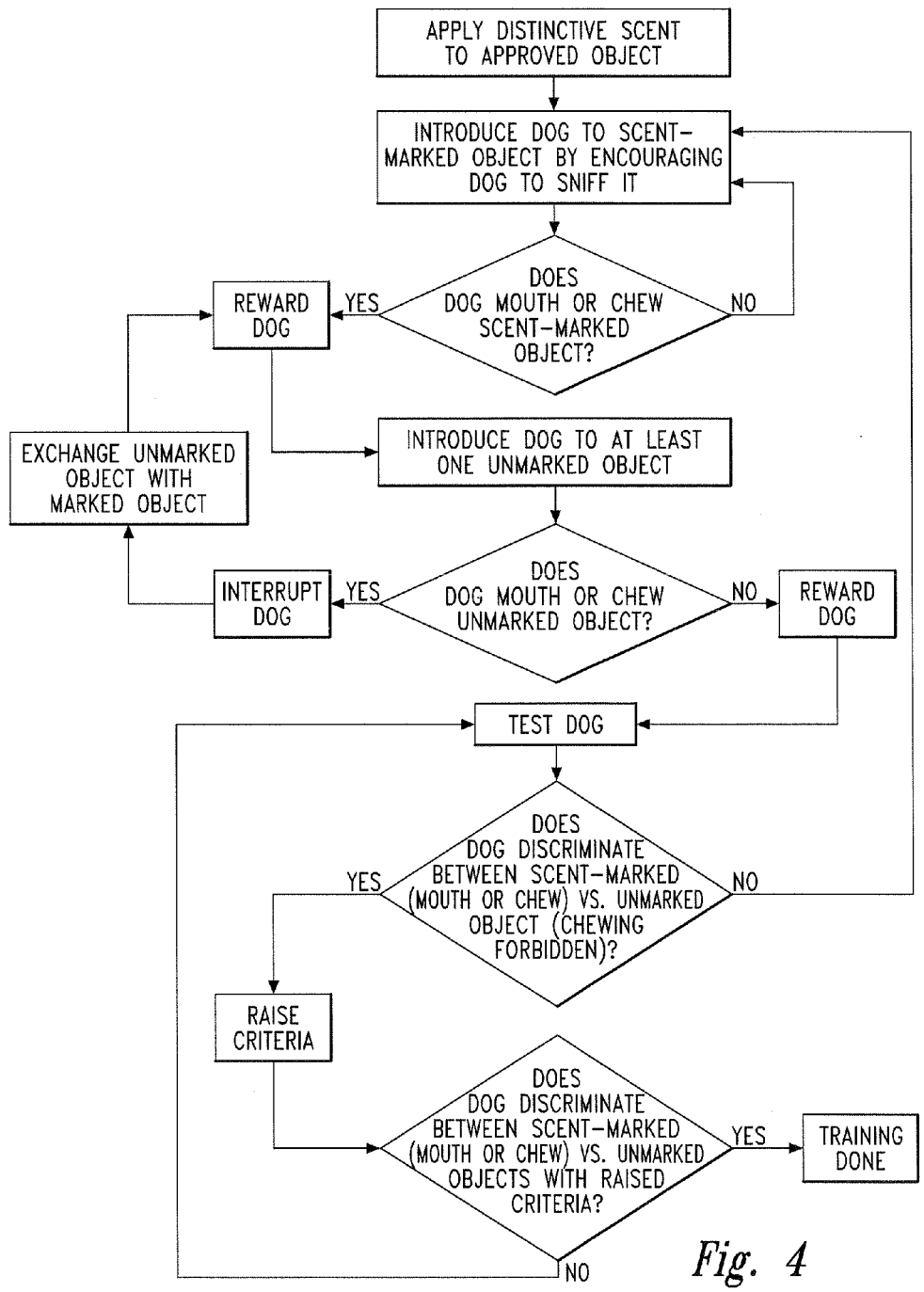
FIG. 4 is a flow chart of a second alternate method of the invention.

Referring now to FIG. 4, the method may include the additional step of "raising criteria" in which the owner or trainer repeats the protocol with additional variables (taking the scented object outside or hiding the scented object among unmarked objects). In this way, the dog can demonstrate further comprehension be selecting only the marked items regardless of natural or contrived variables.

The term dog is used broadly in the specification and claims and is intended to include puppies and other similar type household pets that function as human companions, have a keen sense of smell, and naturally tend to chew objects that may be undesirable or unhealthy.

Figure 5:
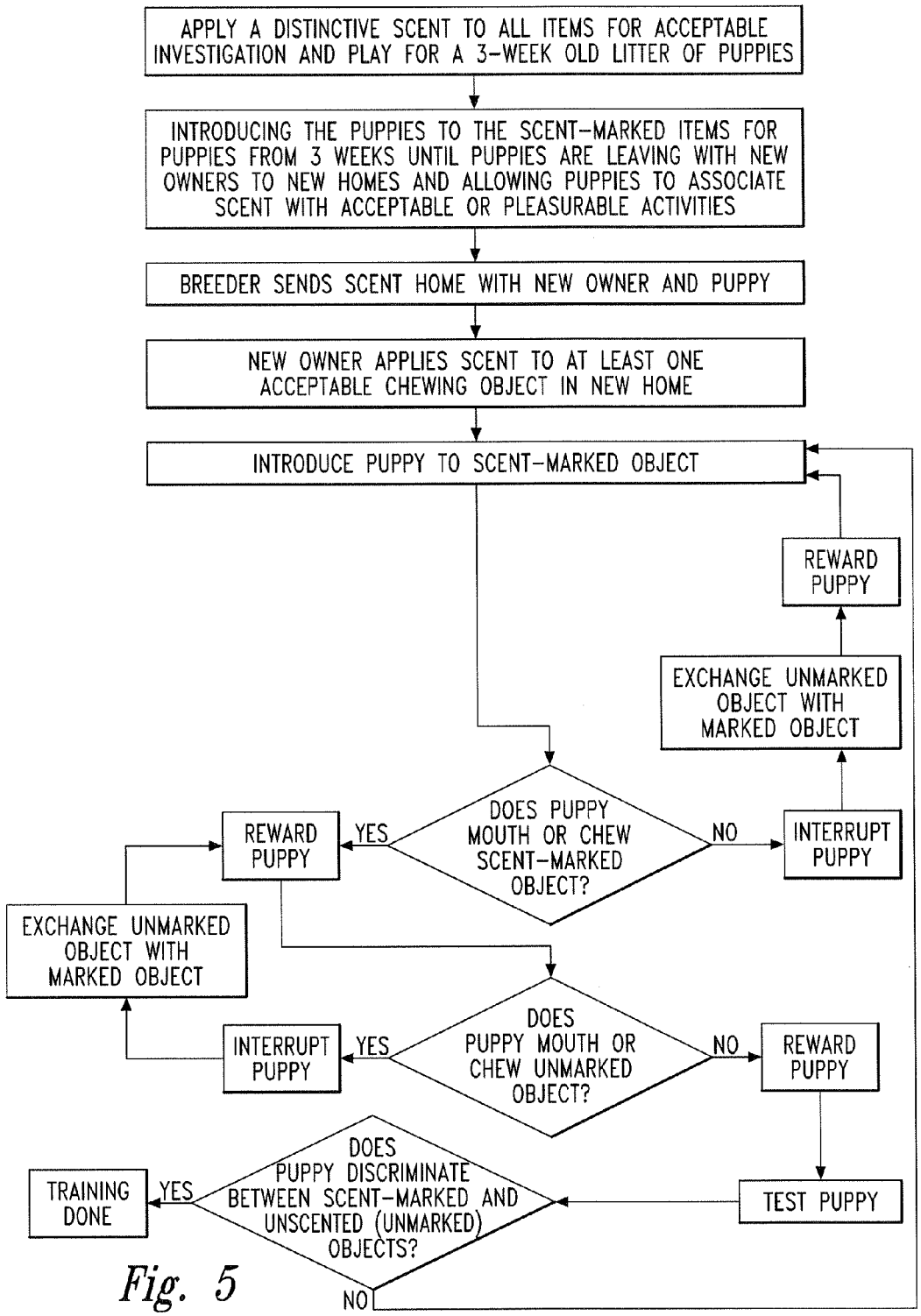
FIG. 5 is a flow chart of a third alternate method of the invention.

Referring to FIG. 5, the method may also be adapted for breeders that are conditioning puppies from birth until sale or placement. In this aspect of the invention, the breeder applies the distinctive scent to all items given to puppies for investigation and play from approximately the third week after birth. The puppies perceive and recognize the distinctive scent, which will be associated with pleasurable activities, namely, mouthing, chewing, and playing. The breeder would then give the distinctive scent to the new owners, who would then apply the scent to owner-approved toys. The owner then uses the same steps identified above to train a puppy to chew only approved toys.

By the fact that the distinctive scent will not be encountered on any items not deliberately or inadvertently marked with it, the dog will not associate items such as furniture, shoes, papers, etc. with chewing or play.

The distinctive scent that works best is one that is both attractive to dogs and not encountered in the natural or human indoor or outdoor environment. Taking two or more disparate animal urine scents/animal secretion scents, or the synthetic versions thereof, and diluting the scents with water have been used with good results. Here, disparate means where the species would not normally be found in the same location, e.g., a bird and terrestrial mammal. This disparate combination makes it virtually certain that the scent marker applied to the dog's toys will be unique and not encountered in nature or in a home or other indoor/human environment.

Further, animal-derived scents, particularly those of animal secretions (urine or other bodily secretion), powerfully attract the attention, curiosity, and interest of dogs. Such animal urine/body secretion scents do not automatically elicit a stereotypical or automated response from a dog. The odor from animal urine/bodily secretions arouse in dogs the desire to sniff and investigate the source. It does not prompt a dog to eat, fear, or urine-mark the source of the scent.

Moreover, such animal urine/secretion scents have chemical concentration strength and staying power. Even when diluted with water so that humans do not find the odor offensive, dogs can still smell the scent, even over time when the animal urine/bodily secretion is in the process of dissipating.

According to one aspect of the invention, the scent marker can be a blend of any number of animal urines diluted with water or distilled water. The animal urine/secretion scent is preferably not derived from an animal known to be predatory or dangerous to dogs. Good combinations include taking the urine from the following: deer, elk, muskrat, raccoon, rabbit, squirrel, and mixing it with the urine or urea of pheasant, grouse, quail, partridge, turkey, duck, or goose. These scents, or synthetic versions, are available for purchase, particularly related to the hunting industry.

The chemical strength ratio is normally about 40% animal urine and 60% water. One such chemical composition that provided excellent results comprises one part raccoon urine, one part quail urine or urea, and three parts water. Other compositions include one part deer urine and one part grouse urine/urea; one part deer and one part quail urine/urea; or one part deer and one part partridge urine/urea; all diluted with water in the same general ratio.

This chemical composition may be applied as a liquid from a bottle with a drop-dispensing spout or placed into a bottle for applying directly onto an acceptable chewing object. The chemical composition may also be augmented with a time-release gel powder, such as UR-A-GEL, by Buck Stop Lure Co, of Stanton, Mich., in order that the composition is in the form of a gel, as opposed to a liquid. The resulting liquid or gel may be applied to objects selected by a dog's owner or trainer for the dog to play with and/or chew on.

Through the application of basic scent-discrimination training protocols, the scent essence acquires, for the dog, a permissive meaning, enabling the animal, even in the absence of the owner or trainer, and even when objects marked with the scent essence have not previously been encountered by the dog, to recognize objects so marked as dog toys, however dissimilar the marked objects may be otherwise, and to distinguish objects so marked from all other objects.

The liquid scent marker applies a discernible odor when applied to all surfaces, textures and materials commonly used in the manufacture of dog toys, including but not limited to rubber, cloth, plastics, leather and synthetic materials. The diminution/degradation of the scent over time on marked objects, and the interaction of the scent marker with any odors inherent in the marked objects are insufficient to interfere with the dog's ability to perceive and correctly interpret the scent marker.

It is to be understood that many changes in the particular composition, materials, and features of the invention may be made without departing from the spirit and scope of the invention. Further, variation may be made in the steps or steps or in the sequence of steps comprising the methods described herein. Therefore, it is the Applicant's intention that her patent rights not be limited by the particular composition described herein, but rather by the following claims interpreted according to accepted doctrines of claim interpretation, including the Doctrine of Equivalents.

What is claimed is:

1. A method of positive-reinforced scent training a dog for reliable recognition and selection of approved objects for chewing and playing, the method comprising:
    applying a distinctive scent to at least one acceptable object for mouthing/chewing, said distinctive scent being a combination of two or more animal secretions diluted in aqueous solution wherein the combination is not naturally found in nature;
    introducing a dog in need of acceptable chewing training to the distinctive scent by allowing the dog to sniff the distinctive scent-marked on the at least one acceptable object;
    rewarding the dog if the dog mouths the at least one scent-marked object;
    introducing the dog to at least one unmarked object;
    testing the dog to see if it can discriminate between the at least one scent-marked object, in that it mouths or chews the at least one scent-marked object, and the at least one unmarked object in that it does not mouth or chew the at least one unmarked object;
    rewarding the dog if it mouths only the at least one scent-marked object;
    interrupting the dog if it mouths the at least one unmarked object;
    repeating the testing until the dog only mouths the at least scent-marked object.

2. The method according to claim 1 further comprising the step of applying the scent only to other acceptable objects once the dog associates the scent with acceptable chewing.

3. The method according to claim 1 further comprising the step of applying the scent only to all acceptable objects once the dog associates the scent with acceptable chewing.

4. The method according to claim 1 wherein the step of interrupting further comprises exchanging the unmarked object with a scent-marked object.

5. The method according to claim 1 further comprising the step in which the owner/trainer raises criteria in the testing step.

6. The method according to claim 1 wherein the step of rewarding the dog is used in conjunction with a clicker and the dog is given a treat.

7. The method according to claim 1 wherein the distinctive scent is derived from the combination of dilution of disparate animal species' secretions.

8. The method according to claim 7 wherein the scent is comprised of about 40% animal secretions and 60% aqueous solution.

9. The method according to claim 7 wherein the scent is comprised of one part animal secretion, one part of a disparate animal secretion, and three parts aqueous solution.

10. The method according to claim 9 wherein the one part animal secretion comprises one of the following: deer, elk, muskrat, raccoon, rabbit, or squirrel; and wherein the disparate animal secretion comprises on of the following: pheasant, grouse, quail, partridge, turkey, duck or goose.

11. The method according to claim 7 wherein the scent is comprised of one part urine of raccoon;
one part urine or urea of quail; and
three parts aqueous solution.

12. The method according to claim 1 wherein the scent is in the form of a liquid.

13. The method according to claim 1 wherein the scent is in the form of as a gel.

* * * * *